May 10, 1966   Y. C. SUEL   3,251,000
SAFETY SYSTEM FOR A SEQUENCE TIMING CONTROL
Filed Nov. 15, 1963   5 Sheets-Sheet 5
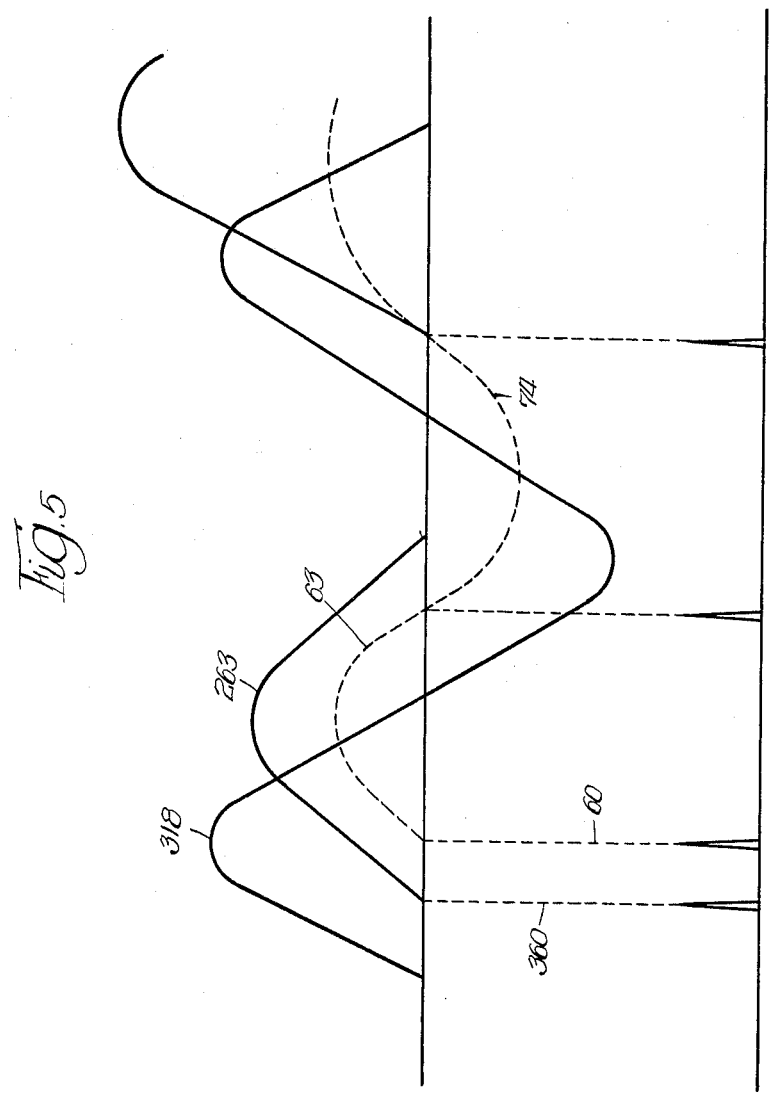
INVENTOR.
Yves C. Suel,
BY
Byron Hume Groen & Clement
Attys �# United States Patent Office 3,251,000
Patented May 10, 1966

3,251,000
SAFETY SYSTEM FOR A SEQUENCE TIMING CONTROL
Yves Charles Suel, Thiais, France, assignor to Welding Research, Inc., Chicago, Ill., a corporation of Illinois
Filed Nov. 15, 1963, Ser. No. 324,053
8 Claims. (Cl. 328—73)

The invention relates to electrical circuits such as may be employed in resistance welding machines and has reference in particular to an electrical circuit of this character wherein the controlling pulses at the beginning of each half cycle of the power current are produced from the pulses supplied by the load circuit at the end of the preceding one-half cycle and in such a way that the load current is interrupted in case of any misfunctioning of the circuit components.

The invention is disclosed as embodied in an electric circuit comprising timers or time counters for the automatic control of the duration of an operation or operations that they have to perform, certain of these operations being related to supplying alternating current to a load circuit. This is particularly the case in an electric welding circuit.

It is known in these electric circuits that the control assures the automatic functioning and particularly the timing of the current flow in the pieces to be welded. This time is generally short, but if for some reason the welding current is not stopped, the workpiece to be welded can be destroyed because of the very high value of the currents used. The present invention has for its purpose to correct this inconvenience.

To this effect, this invention relates to an electrical machine for producing many succeeding operations, of which one at least consists in supplying to a load circuit an alternating current, the power being controlled by the pulses produced for each one-half cycle. This machine also controls the phase shifting at the start of the half cycles of the power current as related to the alternating current supply network. This electrical machine is characterized by the fact that the control pulses at the beginning of each one-half cycle of power current are produced or originated from the pulses supplied by the load circuit at the end of the preceding one-half cycle and in such a way that the load current is stopped in case of any misfunctioning or failure of the components of the circuit. Unless the power current is terminated in such events, the work pieces being welded could be destroyed.

According to one mode of realization, the pulses coming at the end of each one-half cycle of the power current are fed into a time counter, the time counter controlling each operation by counting a predetermined number of pulses supplied to the load circuit and which thereby determines the duration of each operation of the machine.

The pulses originating at the end of each one-half cycle of the power current start a sawtooth generator. The sawtooth voltage produced by the sawtooth generator is combined with a square wave voltage to determine, when the level of the sawtooth becomes smaller than the level of the square wave, the moment at which the half cycles of the power current are initiated and which controls the phase as related to the alternating current supply network.

The invention has been illustrated and will be described as embodied in a resistance welding machine, wherein a welding transformer delivers a power current to a load circuit including the welding electrodes.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

FIGURE 5 is a diagram showing pulsating currents corresponding to the normal functioning of the machine.

Figure 1:
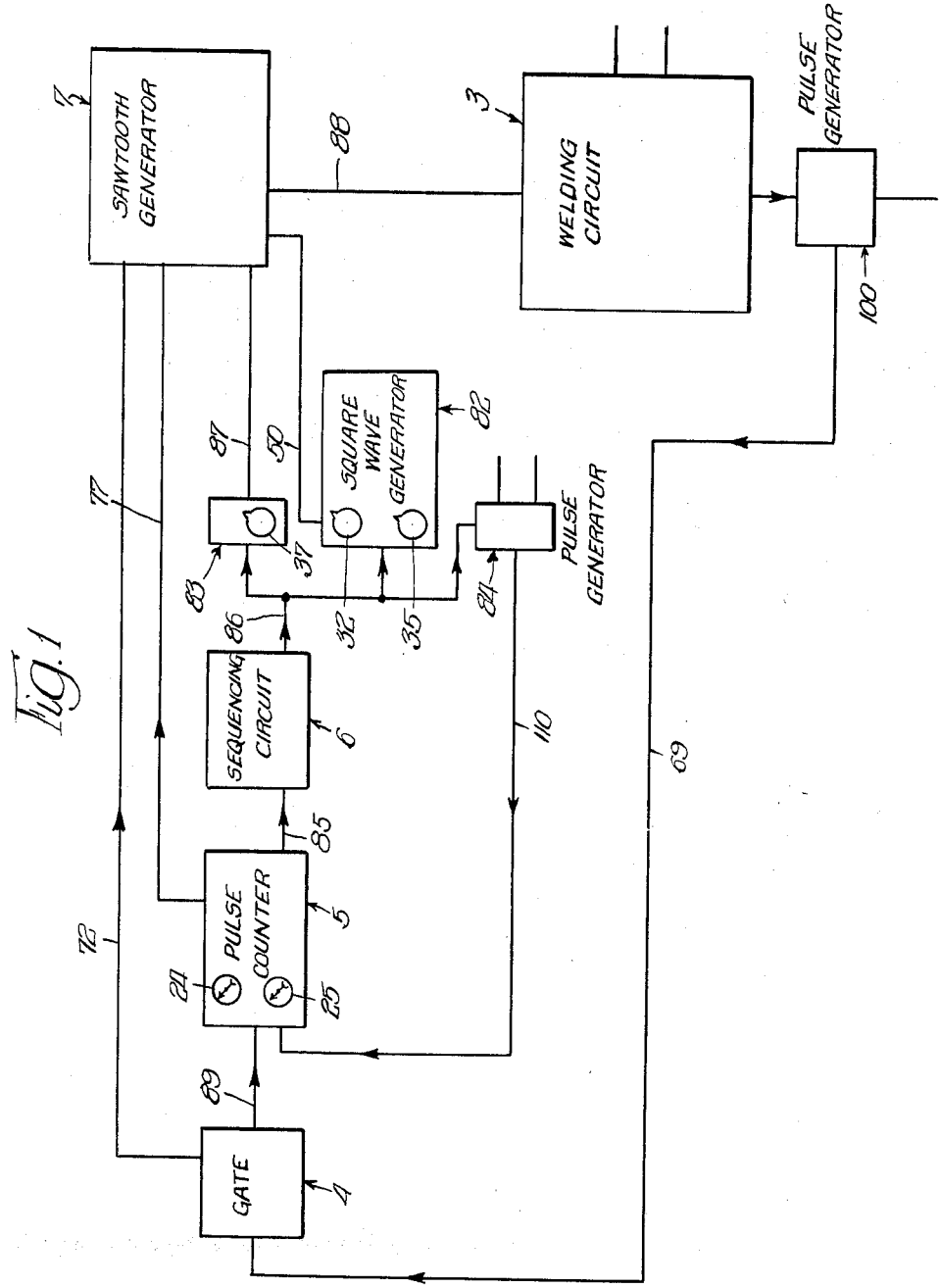
FIGURE 1 represents the functional diagram of the machine in a particular case when it has to control two succeeding operations of which one relates to the passage of the pulsated electric current in a load circuit.

The welding machine represented in FIGURE 1 produces two succeeding operations, namely "squeeze," that is, the application of the welding electrodes to the pieces to be welded, and "weld" the passage of the welding current.

The machine has the following main components as best shown in FIGURE 1. The power circuit 3 represented in the detail in FIGURE 4 and comprising two components 1 and 2 which can be discharge tubes with control electrodes such as thyratrons, or semi-conductors with control electrodes and which are mounted back-to-back on the supply network represented by the terminals A and B. The network supplies the primary 31 of the welding transformer 3 whose secondary 32 is connected to electrodes 90 and 91. The electrodes 92 and 93 control firing of the power thyratrons 1 and 2, and are respectively connected to the secondaries 41 and 42 of the coupling transformers which supply the voltage peaks provoking the firing of the said thyratrons. It is known that the power supplied by the thyratrons is a function of the phase of the firing peaks as related to the alternating current supply network.

A pulse generator is provided which supplies pulses at the frequency $f$ of the alternating current supply network. A pulse generator 100 is also provided which supplies pulses during the weld time at each extinction of the welding current, which means at a frequency $2f$. Time counter 5 which counts the pulses which it receives either from generator 84 or from generator 100 after passing through a gate 4 which sends to the counter 5 only one pulse out of two. This time counter 5 counts for each operation the number of pulses which correspond to the duration of the operation. The sequencing component 6 is a step-by-step electric circuit which controls the operation being performed and also controls the time counter 5 which in turn counts the number of pulses corresponding to the duration of the said operation. The sawtooth generator 7 and timer 83 determine the start of the first sawtooth. When the generator and timer of the square wave 82 produces a square wave voltage for the welding operation, it determines the start of the square wave as well as its level.

The above equipment functions in the following manner in the case of a welding machine having the succeeding operations of "squeeze," that is, placing the pieces to be welded under the pressure of the welding electrodes, and "weld" the passage of the welding current.

Figure 2:
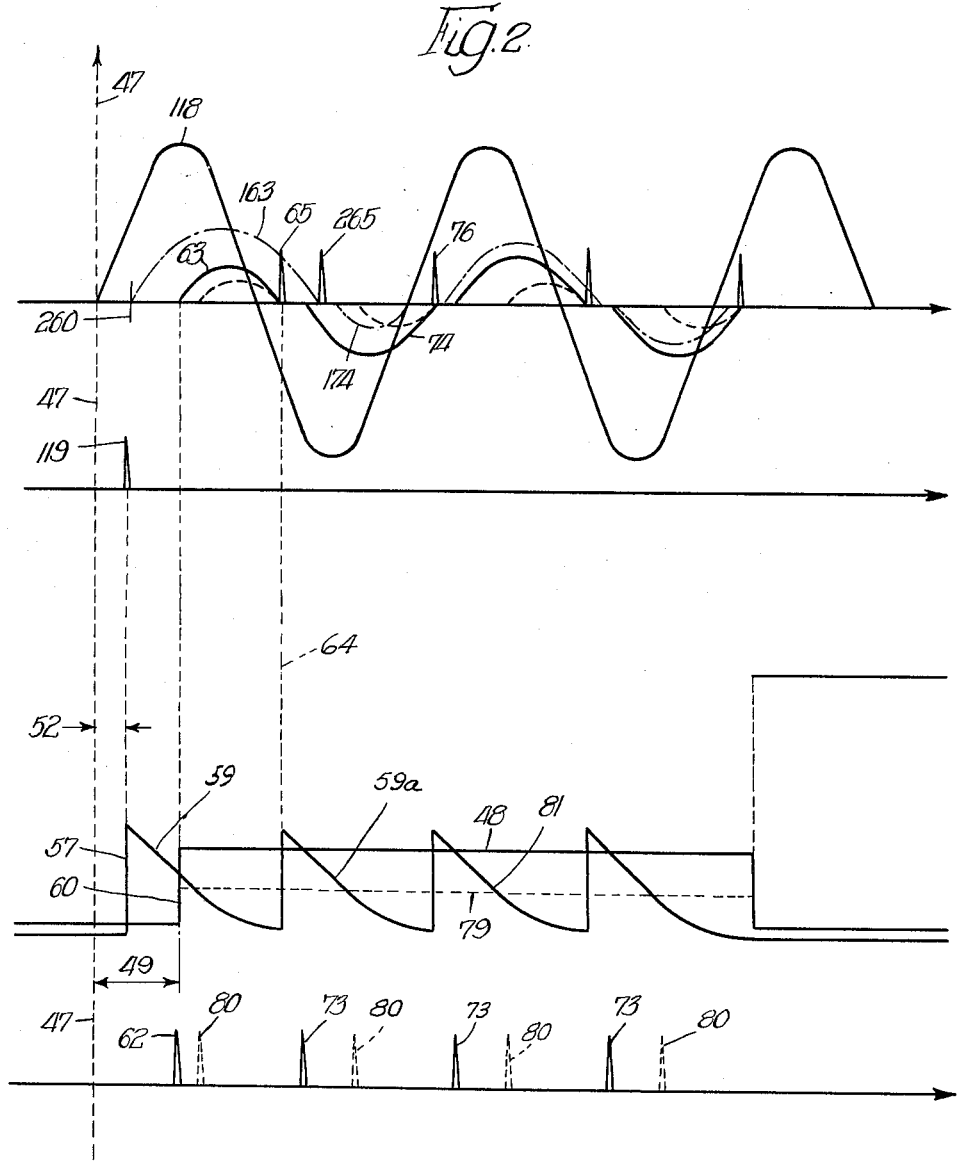
FIGURE 2 represents as a function of time, the voltages and current in the different parts of the machine.

During the "squeeze" operation, the pulse generator of the frequency $f$, the frequency of the alternating current supply network, supplies by the connection 110 pulses to the input of the component 5 counting the time. This counting component 5 counts the number of pulses previously determined and corresponding to the "squeeze" time, and when this time is elapsed, the said component 5 transmits by the connection 85 one pulse to the input of sequencing component 6. This sequencing component 6 produces a signal which it transmits by the connection 86 to the timing generator 82 of the square wave, to the timer 83 of the sawtooth, and to the pulse generator 84, in order to start the following operations:

The timer generator 82 of the square wave produces a voltage 48 in a square form, FIGURE 2, with a delay 49 as compared to the original pulse supplied by the sequencing component 6 at time 47. The delay 49 is manually adjustable by the potentiometer 32. The height of the square wave is manually adjustable by the potentiometer 35. The sawtooth timer 83 produces a pulse 119 with the delay 52 as compared to the original pulse supplied by the sequence component 6 at time 47. The delay 52 is manually adjustable by the potentiometer 37. The pulses produced by the generator 84 are blocked and do not arrive any more to the input of the time counting component 5.

The pulse 119 coming from the component 83 is transmitted by the connection 87 to the sawtooth generator 7 and produces a series of voltages 59 in the form of a sawtooth, the starting of the first sawtooth having the delay 52. The square wave voltage 48 coming from the component 82 is transmitted to the sawtooth generator 7 by the connection 50. The sawtooth generator 7 combines the sawtooth 59 that it produces with the square wave voltage 48 that it receives in such a way that when the level of the first sawtooth 59 becomes smaller than the level of the square wave 48, which means at the time 60 in FIGURE 2, a pulse 62 is produced. This pulse 62 is transmitted by the connection 88 to the circuit controlling the firing of the power tubes in the power circuit 3. This establishes the load current 63 at the time 60. The extinction of this welding current provokes in the generator 100 the production of the pulse 65 and so on at each extinguishing of the welding current. The frequency of the pulses 65 thus obtained is, therefore, equal to $2f$.

The pulse 65 is supplied by the connection 69 to the input of the gate 4 which supplies at each time that it receives a pulse, alternately one pulse by the connection 72 to the input of the sawtooth generator 7, and one pulse by the connection 89 to the counting component 5, which in this manner is counting during the welding time the pulses coming from the power circuit 3. The sawtooth generator 7 as soon as it starts, thus receives alternately with a frequency of $2f$ one pulse coming from the gate 4 by the connection 72 and one pulse coming from the counting component 5 by the connection 77.

This generator 7 produces one sawtooth each time that it reecives a pulse and each sawtooth combined with a square wave 48 creates the pulse 62 which assures the control of the firing of the power tubes in the power circuit 3, and which continues until the moment when the counting component 5 sends its last pulse at the end of the welding time. Effectively at this moment the sawtooth generator does not receive any more controlling pulses and goes off.

The arrangement as described gives many advantages since it permits, in particular, the interruption of the load current in the case of any incident in the functioning of the machine. Instead of controlling the firing of the control valves by the pulses taken directly from the supply network, they are taken from the time counting component, which itself receives the pulses generated by the extinction of each signal of the welding current.

It will thus be understood that if the signal 65 produced by the extinction of the first one-half cycle of the current and transmitted by 69 to the gate 4 did not produce any effect due to a broken wire or a damaged time component, etc., the second sawtooth is not started and as a consequence no welding current can be started.

Even if everything worked normally, the signal transmitted to the power circuit may have no effect at all, as in the case with an ignitron which, after a very long service, has to be replaced. The firing is not consistent and if a mis-firing occurs there is no signal on the line 69 and the welding current is terminated. Also, since one pulse out of two is supplied to the sawtooth generator from the counter 5, if this counter does not work no signal is transmitted by the conductor 77, and everything is terminated as described.

It can be seen that the arrangement behaves as an auto oscillator which cannot function unless all its elements operate as normal. Their protection, therefore, is assured by the present invention which does not depend on outside components since they could have failures and which in turn would have to be protected.

Figure 3:
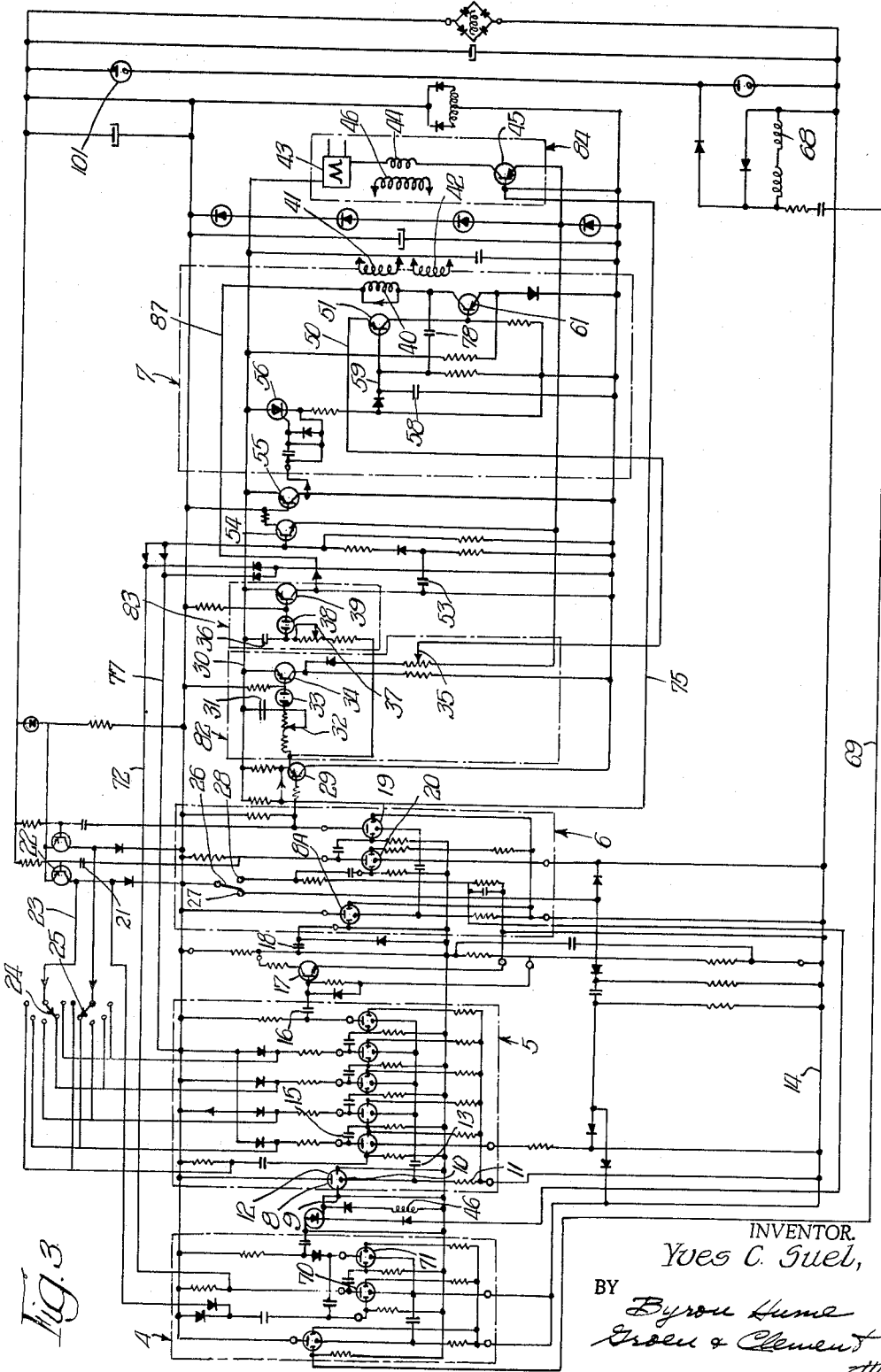
FIGURE 3 shows a circuit arrangement having a mode of practical operation conforming to the functional schematic diagram of FIGURE 1.

Referring in particular to FIGURE 3 the counter 5 is composed of five counting elements which are thyratrons. The first tube 8 is the oscillator tube. When a positive pulse, of about 120 volts, arrives at its control electrode, the current is established between the cathode 10 and the anode 12. In this way the voltage of the cathode, which was at the level of the conductor 14, by the negative pole of the current supply, rises abruptly by about 100 volts. The same thing happens with the right side terminal of the condenser 13 connected at 15 to the five cathodes. Assuming that the left side tube is firing, because of the abrupt elevation of the level of its cathode the voltage available between the cathode and the anode of this tube is smaller than the arc voltage, and this tube goes off. This causes a sharp increase in the voltage at its anode and because of the tying condenser located between the anode of the tube and the control anode of the following tube, this last one fires in its turn. During this time, because of the great value of the resistor 11 placed in series with the cathode of the tube oscillator 8, this tube goes off. Everything is ready for the new pulse in line to provoke the same effect as above.

When the fifth thyratron fires the time condenser 16 connected to its anode transmits a negative pulse to the base of the transistor 17. This base being negative, no effect is produced.

At the extinction of this fifth thyratron the condenser 16 transmits a positive pulse to the base of transistor 17. This transistor becomes conductive during a very short time and goes off. This extinction provokes a positive pulse transmitted by the condenser 18 to the control electrode of the oscillator tube 8A of the sequencing component 6. The phenomena described above will provoke the same effect on component 6, and the firing thyratron 19 will be extinguished and the next one will fire.

When the thyratron 19 fires, its anode transmits by means of condenser 21 a negative pulse to the base of transistor 22. This transistor which was cut off becomes conductive, the voltage of its collector becomes more positive. By the conductor 23 it transmits this positive pulse to one of the terminals of the switch 24. This switch represented in position 2, applies the positive pulse to the anode circuit of the third thyratron and due to the condenser placed between the anode and the control anode of the following thyratron, fires the fourth thyratron. This is the display operation of the counter 5.

After two pulses applied to the input of the counter 5, this counter transmits one pulse to the component 6. The thyratron 19 goes off and the thyratron 20 fires and produces as above the display of the second operation by the commutator 25. The position 4 as indicated, means that after four pulses applied to the input of the counter this counter transmits a signal to the component 6 which extinguishes the second thyratron. The time during which the first thyratron 19 is firing is the "squeeze" time and it is adjusted by the commutator 24. It is counted immediately after the manipulation of the contact of the pedal 26 from the rest position 27 to position 28, which makes positive all the cathodes of the thyratrons and consequently extinguishes them. In the working position 28 the thyratron 19 is fired for the squeeze period. During the weld time set by the commutator 25 the second thyratron 20 is firing.

During this period the voltage of the anode of 20 is lower than the voltage of the base of the transistor 29. As a consequence the voltage of the emitter of this transistor 29, which was at the level of the conductor 30, is lowered and controls the three following circuits:

The timer oscillator of the square wave generator 82 has a condenser 31 which is rapidly charged by the rheostat 32. The common terminal of the rheostat 32 of condenser 31 is connected to a diode 33. When the voltage at the terminals 31 is sufficient, the diode 33 becomes conductive and as a consequence the voltage of the base of the transistor 34 is lowered. This transistor becomes conductive, and the potentiometer 35 connected to each collector is traversed by the current which forms the square wave 48. The slider of the potentiometer 35 is connected by the connection 50 to the emitter of the transistor 51 of the sawtooth generator 7 which in this manner receives the square wave. The slider of the potentiometer 35 adjusts the lever 48 of the square wave of which the origin is at 60. The delay 49 may be compared to the original pulse supplied by the sequencing component 6 at the time 47. The delay 49 is adjusted by the rheostat 32.

The sawtooth generator 7 by means of the timer 83 controls the sawtooth. The timer 83 comprises the condenser 36 charged by the rheostat 37. The diode 38 controls the base of the transistor 39 and when it is conductive, applies a voltage to the primary 40 of a tying transformer which has two secondaries 41 and 42 connected to the control electrodes of the power thyratrons 1 and 2 of the power circuit 3. At the same time one pulse is transmitted by the condenser 53 to the transistors 54 and 55 and to the thyratrons 56 which fires and charges in a very short time the condenser 58 of the sawtooth generator 7. This generator 7 functions as follows:

The condenser 58 is charged at the time 57 adjusted by the rheostat 37. This condenser then discharges according to the sawtooth 59. This sawtooth is corrected by the condenser 78 which produces a reaction. The positive terminal of the condenser 58 is connected to the base of transistor 51. It is known that this transistor 51 becomes conductive if the voltage of its base is smaller than the voltage of its emitter, which means in FIGURE 2, if sawtooth 59 is below the square wave 48. This happens at the time 60. The transistor 51 which is in series with the primary 40 of the tying transformer, becomes conductive and transmits by the secondaries 41 and 42 a pulse 62 to the controlling electrodes 92 and 93 of the thyratrons 1 and 2 of the power. One of them fires producing the first one-half cycle of the current 63 in the load circuit 3.

The pulse generator 84 comprises a pulse transformer 43 which produces positive voltage pulses spaced by one cycle and in phase with the passage at zero of the supply voltage for the power circuit. During the "squeeze" period the time counter functions with the pulses produced by component 43 of the pulse generator 84. When the voltage of the emitter of the transistor 29 lowers at the beginning of the weld the voltage of the base of the transistor 45 is also lowered, being joined by conductor 75. This removes the electrical connection between the pulse transformer 43 and the primary 44 of the tying transformer whose secondary 46 is connected to the input of the time counter 5. Because of this the pulses produced by the generator 43 are not delivered to the input of the counter 5.

Figure 4:
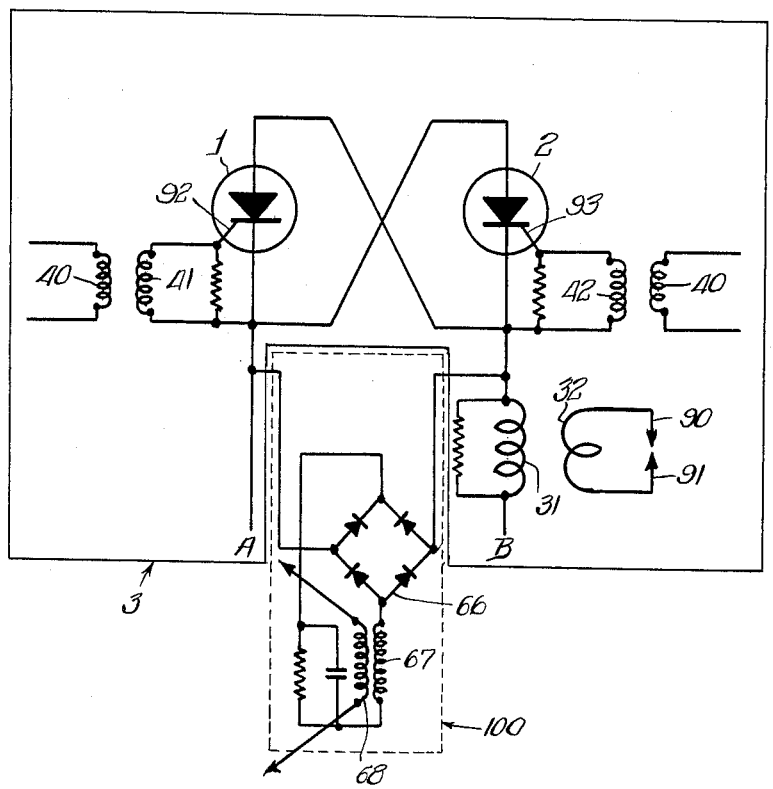
FIGURE 4 represents the power circuit of the machine, the figure also showing the circuit producing the pulses for the counting of time during the function of the power circuit.

On the contrary when the first one-half cycle of the power circuit started by the first sawtooth 59 supplied by the sawtooth generator 7 is interrupted at the time 64, there is produced at the terminals of the thyratrons 1 and 2 of the power circuit 3, a voltage peak 65 which is transmitted to the pulse generator 100 which comprises rectifier 66, FIGURE 4. The rectifier 66 rectifies the pulse before it is applied to the primary 67 of the tying transformer whose secondary 68 is connected by the conductor 69 to the input of the gate 4. This gate 4 will alternately supply one pulse to the counter 5 by the connection 89 and one pulse to the sawtooth generator 7, in such a way that the counter 5 continues to function from the pulses supplied by the power circuit 3. These operations are obtained in the following manner: The position of the gate 4 was made at the same time as the display of the counter 5 for "squeeze" time. The pulse which traverses the commutator 24 is applied to the control anode of the thyratron 70 and fires it. As soon as the pulse 65 arrives at the gate, the thyratron 70 goes off and the thyratron 71 fires. The extinction of the thyratron 70 produces a voltage rise of its anode and through the connection 72 a positive pulse is transmitted to the base of the transistor 54.

It will be clear from the foregoing that by charging the condenser 58 by the thyratron 56 the start of a new sawtooth 59a is produced. In the same way as described the two currents intercept the transistor 51 which is conductive to transmit the pulse 73 to the power thyratrons. In this way the negative half cycle of the current 74 is produced. At the end of this half cycle and in the same way the pulse 76 is produced and applied to the input of the gate 4. The thyratron 71 is extinguished and the thyratron 70 is firing. The extinction of the thyratron 71 produces a positive pulse which is applied to the input of the time counter 5 and extinguishes the thyratron which was firing. The corresponding positive pulse is transmitted by the conductor 77 to the base of the transistor 54. We obtain in this way a new sawtooth 81. The operations follow each other as described until the last thyratron of the counter 5 is extinguished, which happens after a negative half cycle of the current. As a consequence the thyratron 20 of the sequencing component 6 is extinguished and the transistor 29 is no more conductive. This is the end of the weld, although the position of the pedal could be maintained at 28, by bringing this contact to 27 we are ready to restart a new cycle similar to the preceding one.

The arrangement just described solves an important problem, namely the suppression of a transitory period when the current is established. This is particularly difficult to obtain particularly when the load circuit comprises a transformer. This condition is fulfilled after the first half cycle of the current starts at 60 at approximately 90° after the passage through zero of the supply voltage 118. This is the case when during the stable period the current starts before the point above, as in the case of the presented example. On the contrary, FIGURE 2 shows in dotted lines the way in which control of the first half cycle is obtained when the half cycles of the current are phase shifted by more than 90° as compared to the voltage. The level of the square wave 48 is lowered at 79. The first intersection of the sawtooth 59 with the square wave 79 produces the first firing pulse at 80, located to the right of 60. In order to suppress in this case the transitory period, it is necessary to adjust the position of the firing pulse 80 which originates at 57 of the sawtooth adjusted by the rheostat 37 which produces the delay 52.

The level of square wave 48 adjusted by the potentiometer 35 determines the value of the welding current. This current is as much greater as the difference between the end of each half cycle and the beginning of the following one is smaller. The current is maximum when this distance is zero, a result which is obtained when the square wave 50 is at the level of the peak of the sawtooth. This result is independent of the electrical characteristics of the machine, which means that it is independent of the power factor of the machine. It is a known fact that with all known phase shifting systems, the maximum current can be obtained only by adjusting the phase shifter which is dependent on the power factor of the machine. If this adjustment is not well done, either a current is obtained which is smaller than it should be or a firing of only one of the tubes is obtained, which produces a direct current in the supply transformer of the plant. How the welding current is stopped in the case of some defect, or in the event of failure of a circuit component will now be explained. Actually let us suppose that after the extinction of one power tube of the power circuit the signal, transmitted by 67 and 69 to the gate 4 and then directly to thyratron 56 of the sawtooth generator 7, or by passing through the counter 5, did not produce the firing of the other power thyratrons. In such case it is evident that no other signal will arrive at the gate and that in this way the counter will not continue and there will be no more welding current. The result obtained will be a complete stoppage of the current and the welding machine will have its electrodes closed on the piece to be welded.

In the case of ignitrons' utilization, a simple misfiring of one ignitron is sufficient. It is possible with the invention to detect a defective ignitron which has to be replaced. Functioning with only one thyratron is impossible. We avoid thus the functioning as a rectifier which saturates the high voltage transformer and causes the disconnection of the high voltage. The protection against this defect without this arrangement is almost impossible in low voltage. In another case it will be assumed that the functioning of the two thyratrons is normal, but that the counter has a defect and as a consequence none of the thyratrons are extinguished. The signals transmitted by 67 and 68 to the gate are normal. The signal outgoing by 72 is supplied to the sawtooth generator 7 and fires the corresponding power thyratron. The latter by extinguishing itself produces a signal which is again applied to the gate and which goes out of the gate to the counter 5, but no extinction is produced, and no signal is transmitted by 77 to the sawtooth generator 7.

In a normal arrangement as in FIGURE 5, if the first firing pulse happens to be produced at the time 360 in advance of the normal time 60, then what is produced is a transitory period such as the first half cycle 263 having an amplitude and duration superior to the normal, namely 63. When the current is extinguished there will be no firing of the negative half cycle 74 because of the displacement of the sinusoid provoked by this transitory period. The firing of the second positive one-half cycle will be produced normally but because the negative half cycle has not been produced, the positive half cycle under consideration has amplitude still greater than the first and the phenomenon becomes greater until the opening of the safety disconnect switch.

On the contrary with a circuit as shown in FIGURE 2, if one fires at 260 in advance on the normal time 60, the first half cycle 163 is superior in amplitude and duration to the normal, so that the firing of the negative half cycle will be possible because the pulse 265 produced by the extinction of the current of this first half cycle will permit the starting of the normal operation. The negative half cycle 174 thus produced will be inferior to the normal, but in a few cycles the equilibrium between the negative and the positive cycles will become established.

What is claimed is:

1. In an electrical circuit, the combination with a source of alternating current, of a load circuit connected to the source of alternating current, an electric discharge valve interposed in said connections and operative when conductive for passing said alternating current to said load, said discharge valve having a control electrode which when energized renders said discharge valve conductive, means for initially energizing the control electrode for passing one half cycle of current to the load circuit, circuit means in electrical connection with the load circuit for sensing current flow in the load circuit and for controlling the energization of the control electrode for each succeeding half cycle in accordance with the current flow as sensed thereby for each preceding half cycle, and additional circuit means including a counter and which is rendered operative by current flow in the load circuit for counting each such energization of the load circuit, whereby said counter acts as a timer in counting the operations of the electrical circuit.

2. An electrical circuit as defined by claim 1, wherein said counter may be rendered operative to terminate said operations after a predetermined number have taken place.

3. An electrical circuit as defined by claim 1, wherein the circuit means having electrical connection with the load circuit produces a pulse at the end of each period of current flow in the load circuit, and wherein said pulses are counted by the counter and are additionally effective in producing energization of the control electrode.

4. An electrical circuit as defined by claim 1, wherein the circuit means having electrical connection with the load circuit includes a pulsing component which produces a pulse at the end of each period of current flow in the load circuit, wherein said pulses are counted by the counter and are additionally effective in producing energization of the control electrode, and additional phase shifting elements provided by the circuit means for adjusting the moment on the half waves of the alternating current when the discharge valves are rendered conductive.

5. In an electrical circuit, the combination with a source of alternating current, of a load circuit connected to the source of alternating current, a pair of electric discharge valves interposed in said connections in back-to-back relation and operative when conductive for passing said alternating current to said load, each said discharge valve having a control electrode which when energized renders its discharge valve conductive, means for initially energizing the control electrode of one discharge valve for passing one half cycle of current to the load circuit, circuit means in electrical connection with the load circuit and operative to produce a pulse at the end of each period of current flow in the load circuit, said circuit means including a component for sensing said pulses and for controlling energization of the control electrodes for each succeeding half cycle in accordance with current flow as sensed thereby for each preceding half cycle, and a counter provided by said circuit means and which is operative to count one of every two such pulses, whereby said counter acts as a timer in counting the operations of the electrical circuit.

6. In a control circuit including a winding providing a load, a source of alternating current and a pair of electric discharge valves for controlling flow of current in the load circuit, said valves being interposed between the source and the load in back-to-back relation and each having a control electrode for controlling the firing of its valve, whereby one discharge valve when fired will pass one half cycle of the alternating current to the load in one direction and the other valve when fired will pass another half cycle of the alternating current to the load in a reverse direction, an electronic circuit in electrical connection with the load, means for initially firing one of said discharge valves to pass one half cycle of alternating current to the load, said electronic circuit including a component operative to produce a pulse at the end of each period of current flow in the load circuit, additional components provided by the electronic circuit for sensing said pulses and for controlling energization of the control electrodes to fire the discharge valves for each succeeding half cycle in accordance with current flow as sensed thereby for each preceding half cycle, and phase shifting means for shifting the firing point of said discharge valves with respect to the alternating current source, said phase shifting means employing said pulses as a source of energy whereby to render said phase shifting means operative.

7. A control circuit as defined by claim 6, wherein said phase shifting means includes a square wave generator which produces a square wave voltage for each of said pulses supplied thereto, and a sawtooth generator which produces a sawtooth voltage for each of said pulses supplied thereto and which also combines said square wave voltages therewith, whereby a pulse is produced when the level of the sawtooth voltage becomes lower than that of the square wave, and additional means for supplying said last mentioned pulses to the control electrodes for firing the discharge valves.

8. A control circuit as defined by claim 7, wherein the square wave generator is adjustable to vary the starting point of the square wave and its level and wherein the sawtooth generator is also adjustable to vary the starting point of the sawtooth voltages.

References Cited by the Examiner

UNITED STATES PATENTS

| | | | |
|---|---|---|---|
| 2,373,545 | 4/1945 | Cooper et al. | 328—73 X |
| 2,800,611 | 7/1957 | Riley | 219—114 |
| 2,897,413 | 7/1959 | Hodges | 307—88.5 X |
| 3,089,965 | 5/1963 | Krezek | 307—88.5 |

ARTHUR GAUSS, *Primary Examiner.*

J. HEYMAN, J. ZAZWORSKY, *Assistant Examiners.*